United States Patent [19]

Richard et al.

[11] Patent Number: 5,293,721
[45] Date of Patent: Mar. 15, 1994

[54] HORIZONTAL CABLE ANIMAL BARRIER

[75] Inventors: James T. Richard, Holden; George J. Costigan, Westford, both of Mass.; David J. Perry, Auburn, N.H.; Kevin T. Eldridge, Cheshire, Conn.

[73] Assignee: The Omt Group, Auburn, N.H.

[21] Appl. No.: 681,573

[22] Filed: Apr. 5, 1991

[51] Int. Cl.⁵ .............................. A01K 39/01
[52] U.S. Cl. .................... 52/101; 119/57.9; 174/41; 114/221 R
[58] Field of Search .................. 52/101; 119/57.9, 96, 119/143, 903, 52.3; 174/41; 114/221 R; 47/24

[56] References Cited

U.S. PATENT DOCUMENTS

| | | | |
|---|---|---|---|
| 1,512,618 | 10/1924 | McDonald | 47/24 |
| 2,210,658 | 8/1940 | Fassman | 114/221 R |
| 2,617,378 | 11/1952 | Osol | 114/221 R |
| 4,523,546 | 6/1985 | Latham | 119/57.9 |
| 4,535,197 | 8/1985 | Butler | 174/41 |

FOREIGN PATENT DOCUMENTS

| | | | |
|---|---|---|---|
| 0904002 | 12/1953 | Fed. Rep. of Germany | 47/24 |
| 3-010632 | 1/1991 | Japan | 47/24 |
| 2209456 | 5/1987 | United Kingdom | 119/57.9 |

Primary Examiner—Carl D. Friedman
Assistant Examiner—Wynn Wood
Attorney, Agent, or Firm—Joseph S. Iandiorio

[57] ABSTRACT

A horizontal cable animal barrier for mounting on a cable to deter animal passage including a plurality of roller elements each having a central hole for rotatably mounting on a cable and a spacer element between each pair of roller elements and also having a central hole for rotatably mounting on the cable, in which the spacer elements are of a different size than the roller elements on either side to present an uneven, rotating barrier to animals on the cable to prevent the animals from passing.

22 Claims, 4 Drawing Sheets

HORIZONTAL CABLE ANIMAL BARRIER

FIELD OF INVENTION

This invention relates to a passive mechanical small animal barrier for elevated cables particularly suited for an electrical substation overhead getaway squirrel guard.

BACKGROUND OF INVENTION

There are many situations in which it is desirable to prevent small animals such as squirrels from passing along a suspended cable. For example, it is desirable to keep rats from climbing along ships hawsers, squirrels from climbing along cables to reach a bird feeder, or squirrels or other small animals from climbing along power lines, especially the overhead getaways running into electrical substations.

The most commonly used protector is a large disc mounted to the cable, such as that shown in U.S. Pat. Nos. 2,493,107, and 4,523,546. These discs suffer from a number of drawbacks which prevent them from being successful animal barriers on horizontal cables. For one, since squirrels can jump many feet, the discs would need to be very large to prevent squirrels from simply jumping over the device. Frequently, electrical cables including overhead getaways are spaced relatively closely together, and there is insufficient room for such large discs. Further, the large discs create a severe wind loading problem which may not be acceptable.

Another type of aerial cable guard is disclosed in U.S. Pat. No. 4,262,169. The patented device is designed to prevent animals from chewing on the cable; the device is counterbalanced to maintain it in an upright position. When an animal steps on the top, the device rotates to prevent the animal from getting at the cable. However, squirrels are very adept at walking "hand over hand" upside down along the length of an object, and thus could simply use the patented device as a walkway. In addition, since squirrels can jump many feet, the device would have to be extremely long to prevent the squirrels from simply jumping over it. Further, since the guard is not symmetrical on the wire, a cross wind could cause it to spin.

Another device, U.S. Pat. No. 4,867,104, is designed to prevent squirrels from climbing up from below and reaching the bird feeder. The device has a number of small rotating blocks mounted on a fixed shaft. However, if used in a horizontal orientation, since the blocks are all of the same size, a squirrel would be able to balance on the blocks sufficiently to allow it to run across their tops, or even climb along their bottoms, to defeat the device. In addition, on a horizontal cable there would have to be many feet of such blocks to prevent the squirrel from simply jumping over the guard.

SUMMARY OF INVENTION

It is therefore an object of this invention to provide a horizontal cable animal barrier which is effective in preventing squirrels from passing.

It is a further object of this invention to provide such a barrier which has a relatively small outer diameter so it can be installed on closely spaced wires.

It is a further object of this invention to provide such a barrier which is light and does not add significantly to the load on the cable.

It is a further object of this invention to provide such a barrier which contributes little to cable wind loading.

It is a further object of this invention to provide such a barrier which cannot be traversed by an animal upside down.

It is a further object of this invention to provide such a barrier which has an uneven surface to keep the animal off balance.

It is a further object of this invention to provide such a barrier which may be applied to energized electrical cables.

This invention results from the realization that a truly effective horizontal cable animal barrier may be accomplished with a number of aligned rotatable, symmetric elements of different sizes attached to the cable to present an uneven, unstable surface to a small animal to prevent the animal from passing.

This invention features an animal barrier for mounting on a cable to deter animal passage, including a plurality of roller elements, each having a central hole for rotatably mounting on a cable, and a spacer element between each pair of roller elements and having a central hole for rotatably mounting on the cable, in which the spacer element is a different size than the roller elements on either side to present an uneven, rotating barrier to animals on the cable to prevent the animals from passing. Preferably, both the roller elements and spacer elements are symmetrical about the cable. In one embodiment, the roller elements are relatively large, thin discs and the spacer elements are longer, smaller cylindrical or tube-shaped sections. The elements are preferably made of an insulated material such as a plastic so that they may be mounted to a live wire and so that they do not initiate corona discharge from the wire. The barrier preferably further includes a blocking element larger than the roller and spacer elements for rotatably mounting on the cable to deter the animal from leaping over the barrier. The blocking element is preferably an opaque, relatively thin disc which may be mounted to one of the roller elements at the end of the barrier to prevent the animal from seeing the cable on the other side of the barrier so that the animal does not attempt to leap over the barrier. The blocking element is preferably made of an insulating material such as a black polycarbonate so that it may be applied to a live wire.

In a preferred embodiment, the barrier comprises a number of integral roller-spacer elements, and the integral elements include an enlarged central cavity in the larger disc section to allow interlocking with the tubular spacer element of another roller element. Preferably, the roller and spacer elements are bifurcated so that they may be mounted to a cable. In that case, there is preferably included a clip for holding together the two parts after mounting to the cable. The clip may be accomplished with an angled hook on one half and a hook receiving depression in the other half. Preferably, those elements further include a plurality of interlocking tongues proximate the clip for preventing the element from twisting and dislodging the hook member from the depression. The tongue arrangement may be provided such that there are two outer tongues on one part of the element and a central tongue on the central part for nesting between the outer tongues to prevent the roller element from separating after mounting to the cable. The roller elements are preferably disc-shaped and have a relatively thick periphery to add stiffness and reduce weight. Finally, the barrier preferably includes means such as clamping members for attachment to the cable at each end of the barrier to prevent the barrier element from sliding along the cable.

DISCLOSURE OF PREFERRED EMBODIMENT

Other objects, features and advantages will occur to those skilled in the art from the following description of a preferred embodiment and the accompanying drawings, in which.

This invention may be accomplished in an animal barrier for mounting on a cable to deter animal passage including a number of relatively large roller elements each having a central hole for rotatably mounting on a cable, the roller elements preferably comprising symmetrical members such as discs, with a rotatable spacer element between each pair of roller elements that also has a central hole for rotatably mounting on the cable. The spacer elements are of a smaller diameter than the roller elements to present an uneven, rotating barrier to animals on the cable to prevent animals from passing. The device may further include a large disc mounted at one end of the barrier to prevent an animal on the cable from seeing past the barrier so it does not attempt to jump the length of the barrier. In a preferred embodiment, the barrier includes a plurality of integral elements which together make up a single roller element and spacer element, in which the integral elements are bifurcated to allow them to be installed on a live electrical cable. Preferably, the large disc is also bifurcated and adapted to be mounted on a smaller roller element rather than directly to the cable. The larger disc may be flexible to decrease wind loading on the cable.

Figure 1:
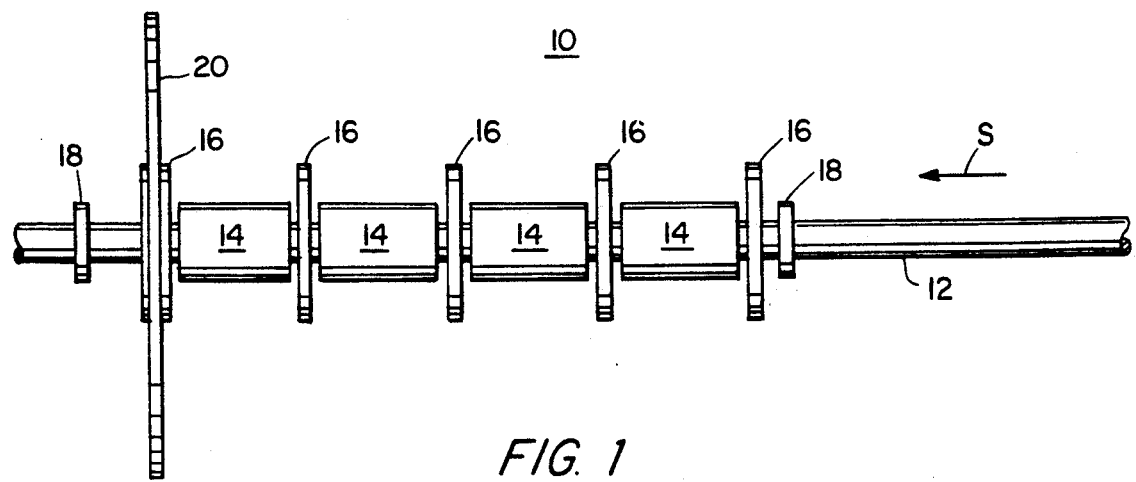
FIG. 1 is an elevational view of an animal barrier according to this invention mounted on a horizontal cable.

There is shown in FIG. 1 animal barrier 10 according to this invention including a number of spaced rotating elements 16, which are preferably disc shaped as shown but may be any shape provided they are rotatably mounted to cable 12. Preferably, elements 16 are symmetrical about the cable to decrease wind-driven rotation, and also so that they easily rotate when an animal steps thereon regardless of their orientation in relation to the cable. Elements 16 are separated by smaller rotatable elements 14 which similarly are preferably symmetrical and are shown as cylindrical. Together, elements 16 and 14 present an uneven, rotating barrier to a squirrel approaching from the direction of arrow S to prevent the squirrel from passing the barrier. In one embodiment, large opaque thin disc 20 is mounted to the last disc 16 to prevent a squirrel from seeing the cable at the far end of the barrier to prevent the squirrel from attempting to leap over the entire barrier; it has been found that a squirrel will not attempt to leap if it cannot see the cable on the other side of the barrier. Stop members 18 are mounted at either end of barrier 10 to prevent the barrier from sliding along the cable to keep it in a desired position.

Preferably, elements 16 and 14 are sized and shaped to present an impassable barrier to squirrels or other small animals. It has been found that it is preferable to have elements 16 approximately 0.3" thick and about 4" in diameter, and elements 14 about 3" to 4" long (thick) and about 1.5" to 2" in diameter. Such an arrangement presents a small animal with an uneven, rotating surface with a number of different sized elements along the body length of an animal so that to cross the device the animal must place its feet at different distances from the cable on objects that readily rotate under the weight of the animal to prevent the animal from balancing on the rotating objects so that the animal cannot carefully walk across the tops of the objects. Further, it is important that at least some of the elements be large enough to prevent an animal from "hugging" them in any attempt to traverse the device by walking hand over hand upside down along the device. Discs 16 thus prevent an animal from walking along the top or bottom side of elements 14. Larger disc 20 may have holes or slots therein to decrease wind loading while still blocking the animal's view so that it does not attempt to leap over the device.

Figure 2:
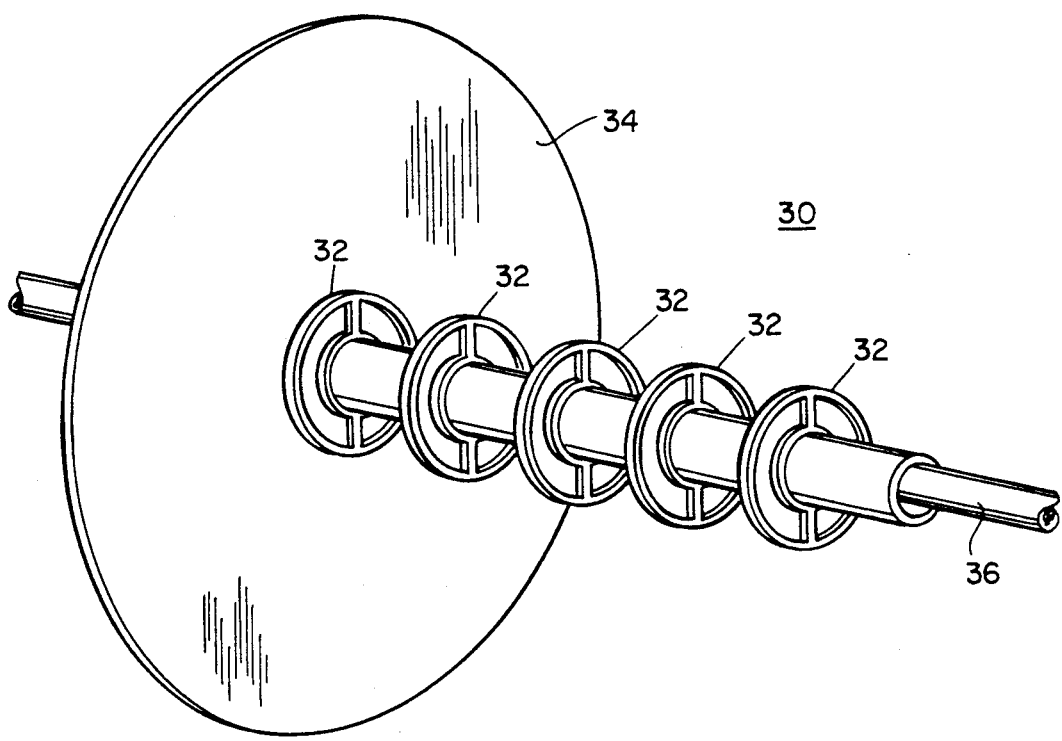
FIG. 2 is an axonometric view of an alternative embodiment of the animal barrier according to this invention.

An alternative embodiment 30 is shown in FIG. 2. Barrier 30 includes five integral roller-spacer elements 32 rotatably mounted on cable 36, with enlarged disc 34 mounted to the larger roller element of one of members 32. Two of members 32 are shown in cross-section in FIG. 3. The overall length of the barrier may be chosen for a desired application. Members 32 include disc section 40 and cylindrical shaft section 44 having hole 46 therethrough for rotatably mounting on a wire or cable of virtually any thickness. Disc 40 has enlarged annular cavity 42 therein to allow tapered portion 52 of an adjacent member to fit therein to provide an interlocking arrangement that prevents shaft section 44 from separating under wind loading, as is further described in conjunction with FIG. 4, which is a detailed axonometric view of one of members 32 before mounting to a cable.

Member 32 includes halves 80 and 82 interconnected by hinge-area 70. Member 32 is bifurcated so that it may be placed on a live cable and closed around the cable with an insulated pole with a tool device on one end, so that the barrier may be mounted on overhead getaways without disrupting their function. The entire device is preferably made of an insulating material such as a plastic material which provides the flexibility necessary to hinge at portion 70 and also prevents corona discharge from the protruding edges when mounted to a live wire. Enlarged disc portion 40 may have a diameter of approximately 4" and a thickness of 0.09"; its thickened rim may have a thickness of about 0.3". Elongated tubular portion 44 may have a length of approximately 4" and a diameter of approximately 1.75" to provide the device with an overall length of about 4" and two different diameters to accomplish the uneven rotating surface which prevents squirrels from passing.

Disc 40 preferably includes reinforced edge portion 68 and inner edge 66 about 0.3" thick to provide additional strength to the disc. Member 32 is held onto the cable by extending clip 60 which fits into slot 58 to prevent lateral separation. When halves 80 and 82 are so joined, tongue 56 fits between tongues 62 and 64 to prevent longitudinal separation of clip 60 from slot 58, which may happen under the twisting effect caused by wind loading.

Figure 3:
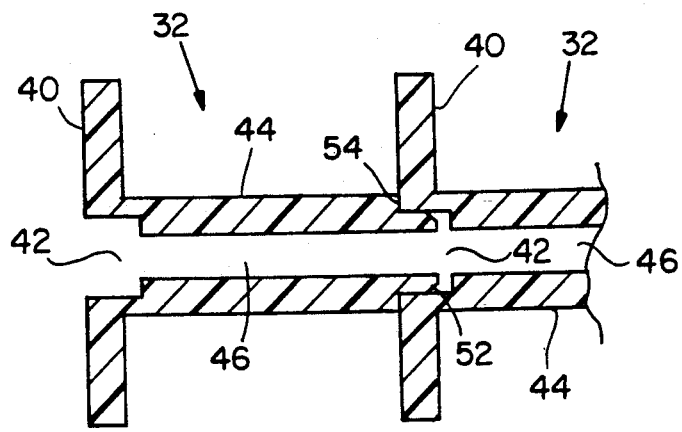
FIG. 3 is a cross-sectional view of two of the rotating elements of the barrier of FIG. 2 showing the interlocking arrangement.
Figure 4:
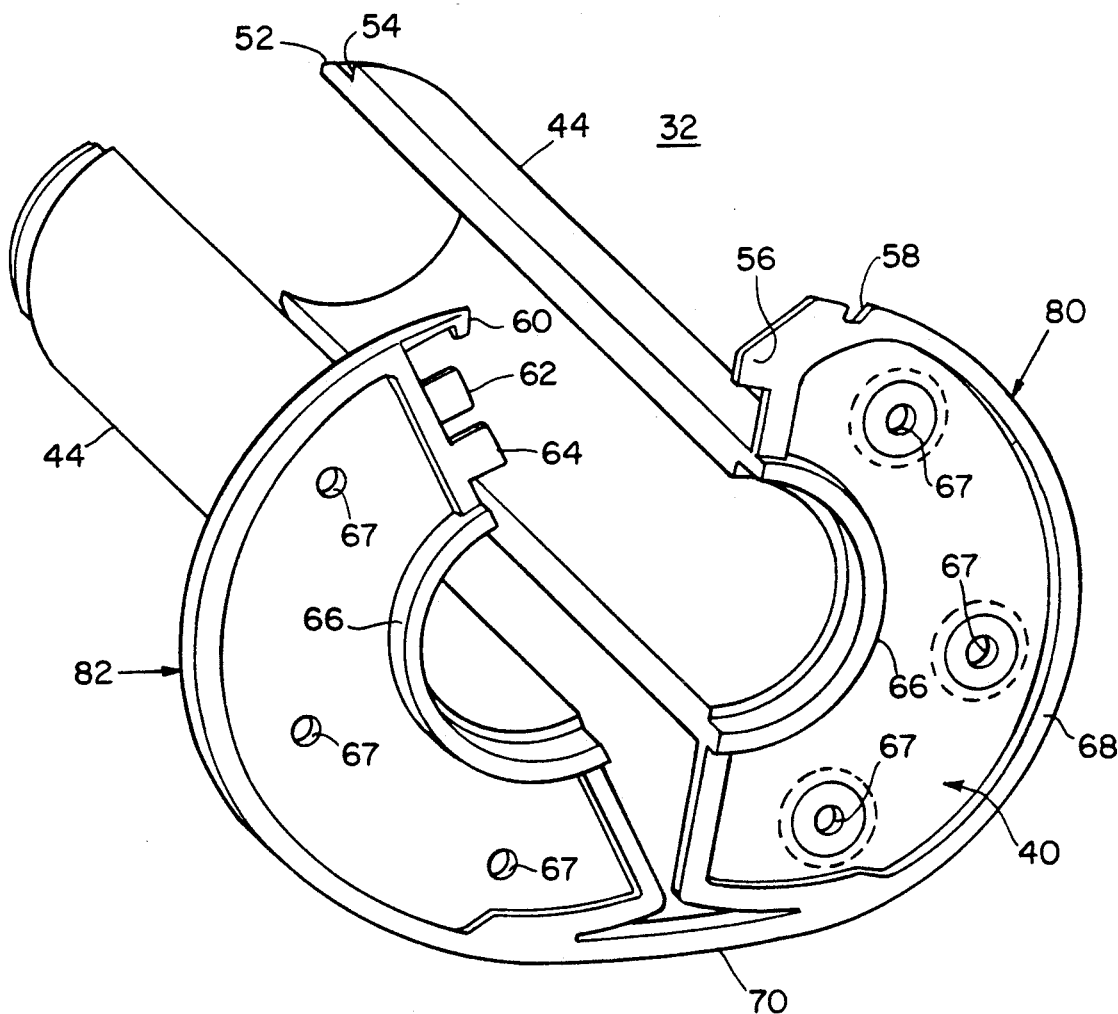
FIG. 4 is a detailed axonometric view of one of the elements of FIG. 2 detailing the manner in which it may be applied to a live wire.

Elongated tubular section 44 includes tapered portion 52 having shoulder 54 against which another member may rest as shown in FIG. 3. This interlocking arrangement prevents the two halves of tubular section 44 from separating under wind loading so that the entire device remains on the cable.

Figure 5A:
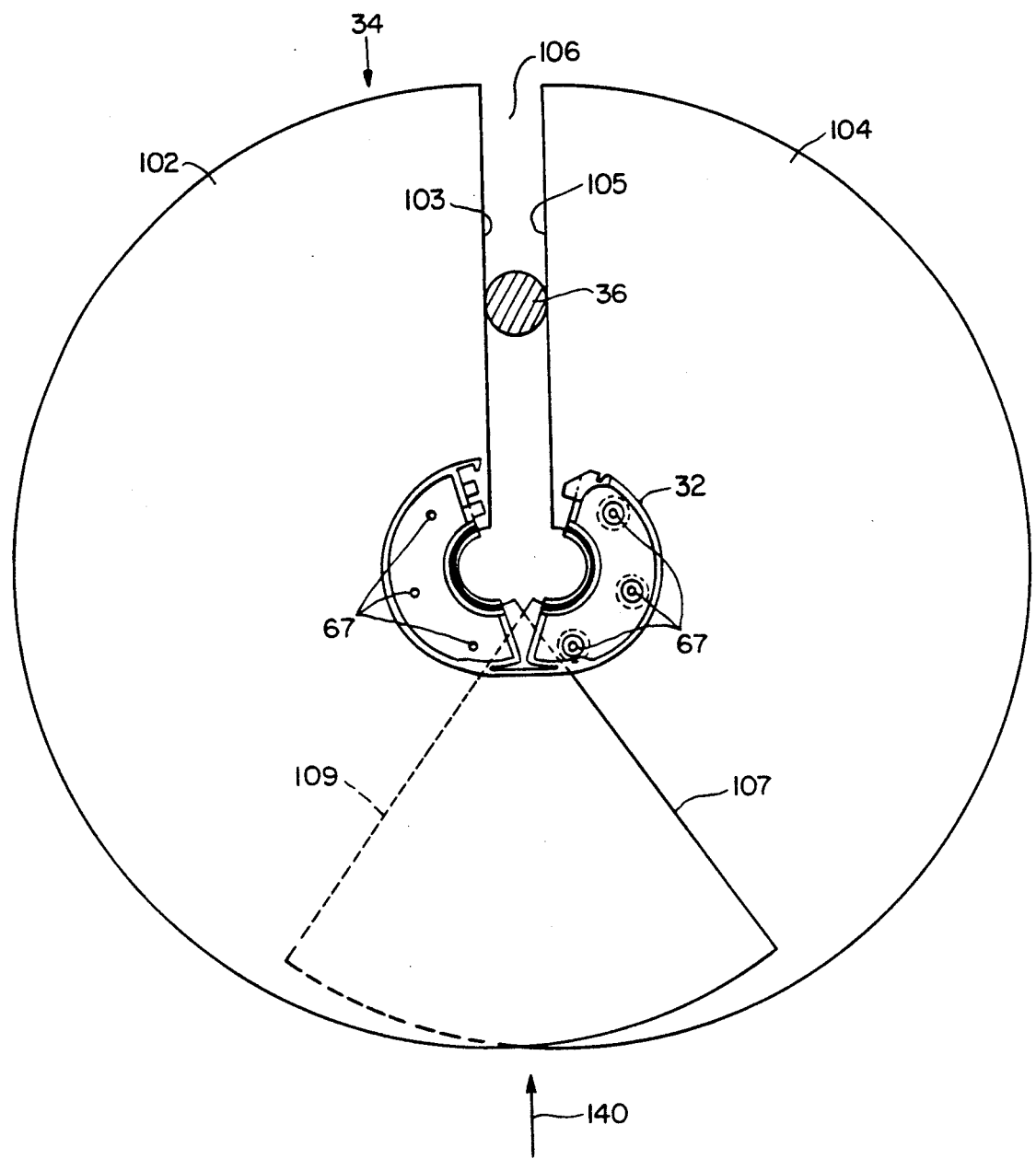
FIGS. 5A and 5B are elevational views of the large disc of FIG. 2 mounted on a smaller disc showing the manner in which it may be installed on a live wire.
Figure 5B:
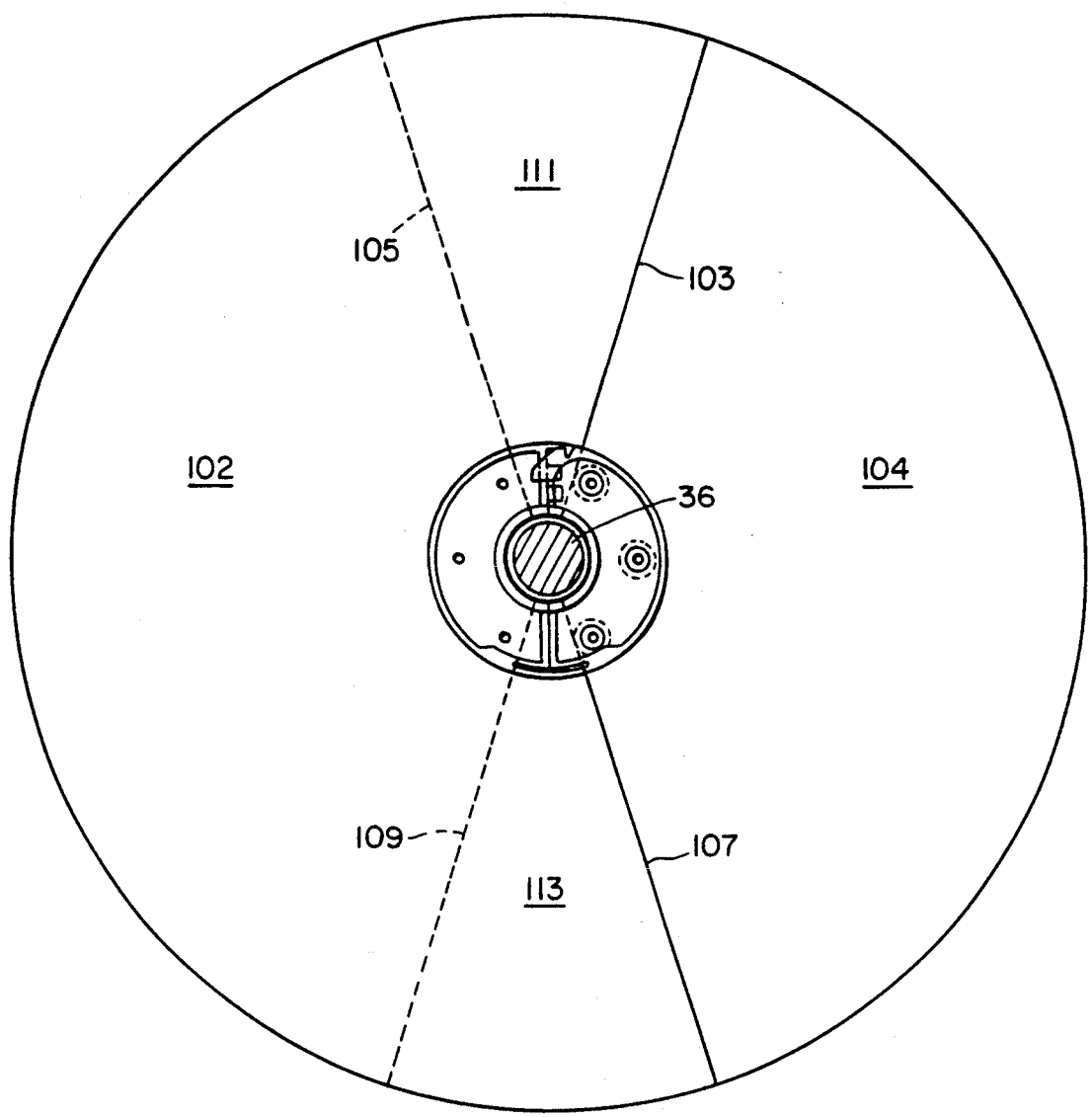

Enlarged disc 34, FIGS. 5A and 5B, is preferably made of two partially annular disc segments 102 and 104, made from a thin plastic or another material so that it is relatively lightweight and flexible to decrease wind loading. Segments 102 and 104 may be mounted to member 32 using holes 67 and aligned holes in segments 102 and 104. Fasteners such as bolts or expanding push-pins may hold the pieces together.

When member 32 is open, edges 103 and 105 of segments 102 and 104, respectively, are separated to provide slot 106 for allowing the entire device to be mounted on cable 36 in the direction of arrow 140. When cable 36 is nestled within member 32, member 32 is closed to lock around cable 36 as explained. When mounted, FIG. 5B, segments 102 and 104 overlap at areas 111 and 113.

Figures 6A, 6B:
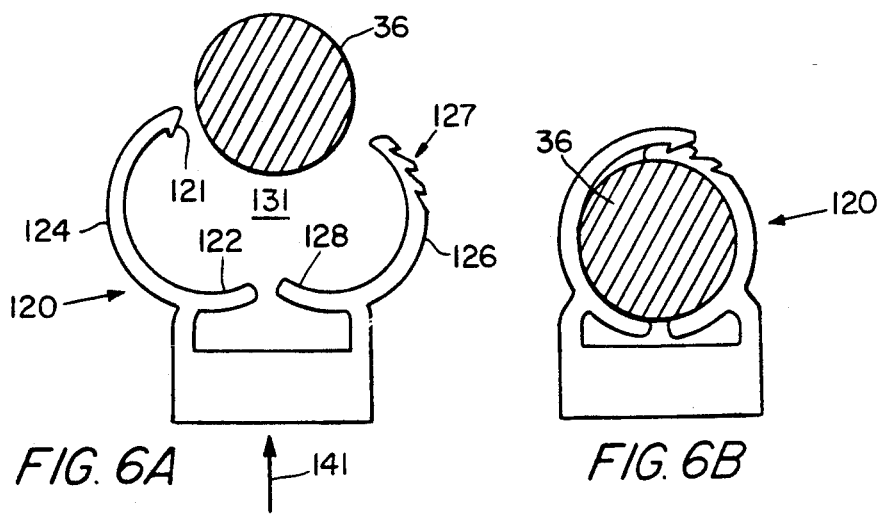
FIGS. 6A and 6B show one type of stop member being mounted to a live wire.

One example of a device which may be used as a stop member to hold the barrier in place is depicted being mounted to cable 36 in FIGS. 6A and 6B. Stop member 120 is a plastic clip with normally open legs 124 and 126 providing space 131 for accepting cable 36. When clip 120 is pushed up against cable 36 in the direction of arrow 141, sections 122 and 128 bear against cable 36, pivoting legs 124 and 126 together to lock catch 121 in serrations 127 to hold clip 120 on cable 36 as shown in FIG. 6B.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An animal barrier for mounting on a non-vertical cable to deter animal passage along the cable, comprising:
   a plurality of spaced, elongated, rotatable spacer elements having a first width and a central passage for rotatable mounting on a cable;
   a plurality of spaced rotatable roller elements separate from said spacer elements, and having a second width larger than said first diameter, and a central passage for rotatable mounting on the cable;
   said spacer and roller elements alternately, adjacently arranged along the cable to present a rotatable, uneven profile elongated rotating barrier at least as long as it is wide to deter animal passage.

2. The animal barrier of claim 1 in which said roller elements are generally symmetrical about the central hole.

3. The animal barrier of claim 2 in which said roller elements are disc-shaped.

4. The animal barrier of claim 1 in which said spacer element is generally symmetrical about the central hole.

5. The animal barrier of claim 4 in which said spacer element is cylindrical.

6. The animal barrier of claim 1 further including a blocking element larger than said roller and spacer elements for mounting on the cable to deter the animal from leaping over the animal barrier.

7. The animal barrier of claim 6 in which said blocking element is opaque to prevent the animal from seeing through it.

8. The animal barrier of claim 6 in which said blocking element is made of an insulating material for application to a power-carrying cable.

9. The animal barrier of claim 6 in which said blocking element includes means for mounting to a roller element.

10. The animal barrier of claim 9 in which said blocking element is thinner than said roller element.

11. The animal barrier of claim 1 in which said roller elements include an enlarged central cavity to allow interlocking with a spacer element of another roller element.

12. The animal barrier of claim 1 in which said roller elements are made of insulating material for application to a power-carrying cable.

13. The animal barrier of claim 1 in which said spacer element is made of insulating material for application to a power-carrying cable.

14. An animal barrier for mounting on a non-vertical cable to deter animal passage along the cable, comprising:
   a plurality of adjacent, aligned bifurcated rotatable elements for mounting on the cable, each said element having a bifurcated spacer element having a first width and a bifurcated roller element having a second width larger than said first width; and
   a large opaque blocking element having a third width larger than said second width for mounting to the cable adjacent or on a said rotatable element to present both a visual and physical barrier to animal passage along the cable.

15. The animal barrier of claim 15 in which said rotatable elements include clip means for holding together their two parts after mounting on the cable.

16. The animal barrier of claim 15 in which said clip means includes an angled hook member on one part and a hook receiving depression on the other part.

17. The animal barrier of claim 15 in which said rotatable elements further include a plurality of interlocking tongues proximate said clip means for preventing said rotatable element from twisting and dislodging said hook means from said depression.

18. The animal barrier of claim 17 in which two outer tongues are on one part of said rotatable element and a central tongue is on the other part for nesting between the outer tongues to prevent the rotatable element from separating after mounting to the cable.

19. The animal barrier of claim 15 in which said rotatable elements are disc shaped with a relatively thick periphery to add stiffness and reduce weight.

20. The animal barrier of claim 1 further including means for preventing said elements from sliding along the cable.

21. The animal barrier of claim 20 in which said means for preventing includes a clamping member for attachment to the cable at each end of the barrier.

22. An animal barrier for mounting on a cable to deter animal passage, comprising:
   a plurality of adjacent aligned, bifurcated rotatable elements, each said element having a bifurcated disc section with a first diameter and bifurcated elongated cylindrical section with a different second diameter centrally disposed on said disc section and having a tapered end for fitting in the disc section of an adjacent rotatable element, both sections having a central hole for rotatably mounting to a cable;

a large bifurcated disc larger than said element disc sections for mounting to one said element disc section; and a stop mounted to the cable at the ends of the aligned rotatable elements to prevent the elements from sliding along the cable under wind load.

* * * * *